United States Patent Office 3,564,937
Patented Feb. 23, 1971

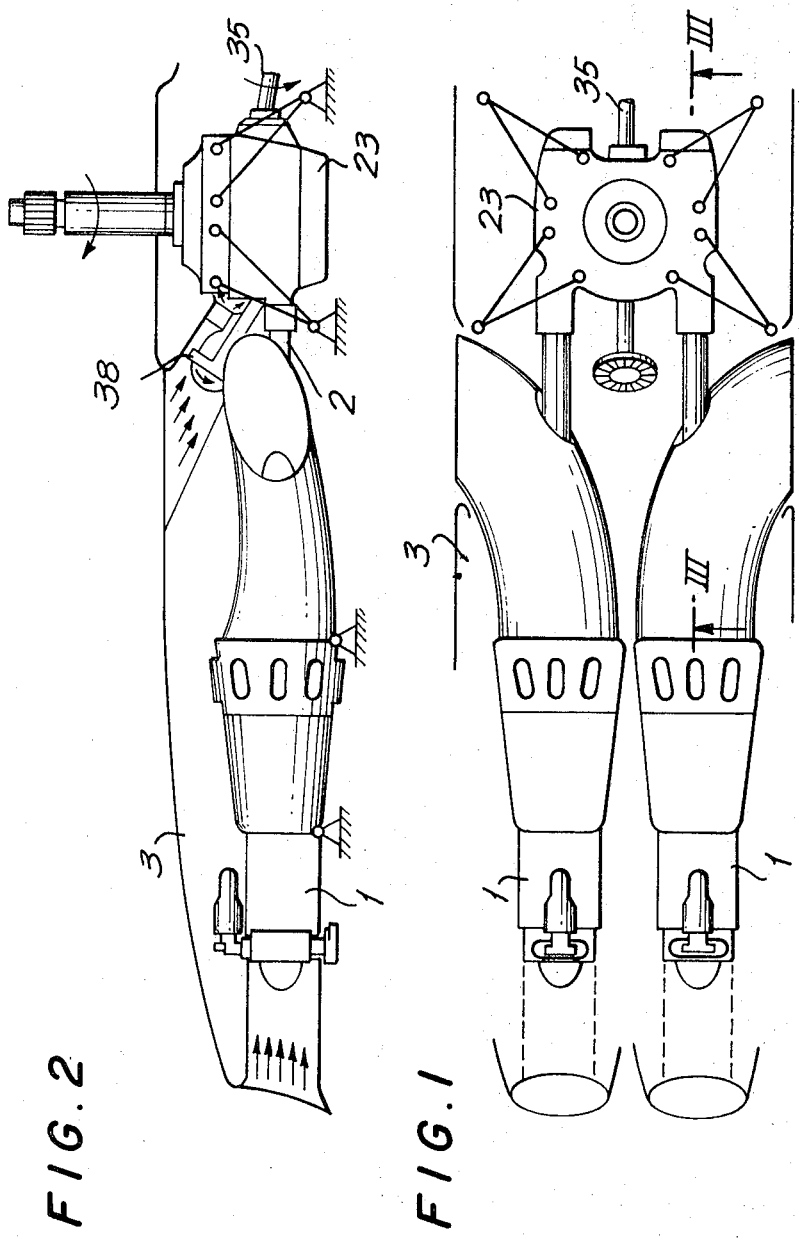

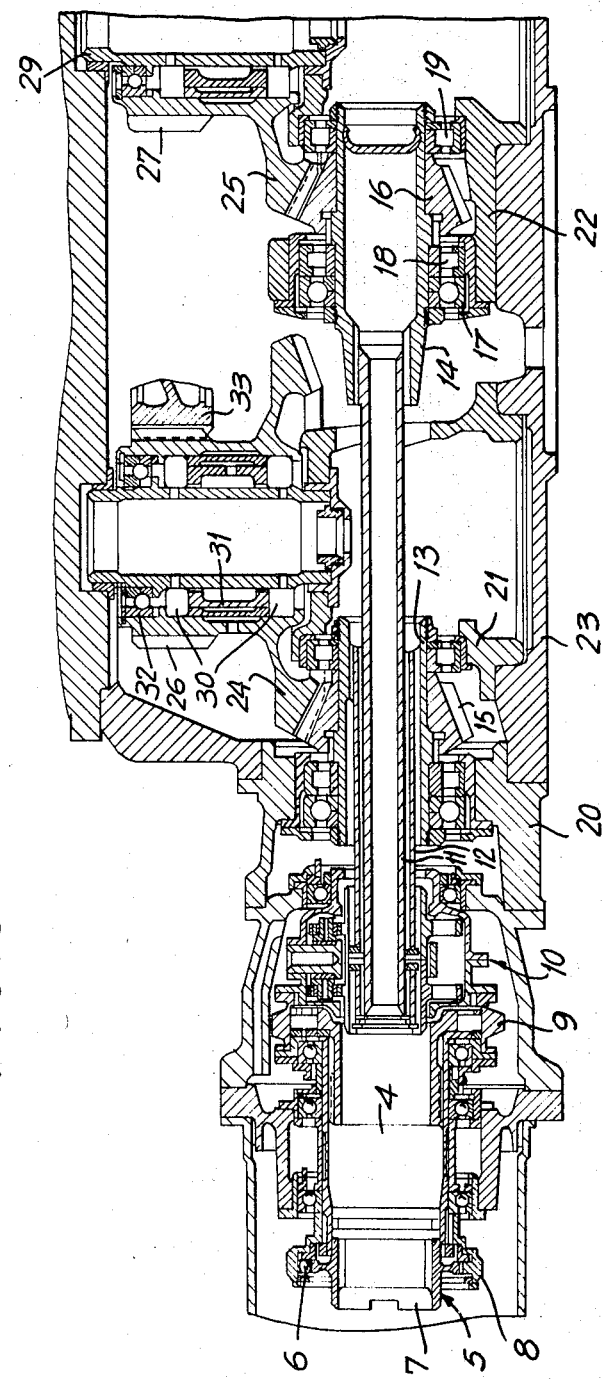

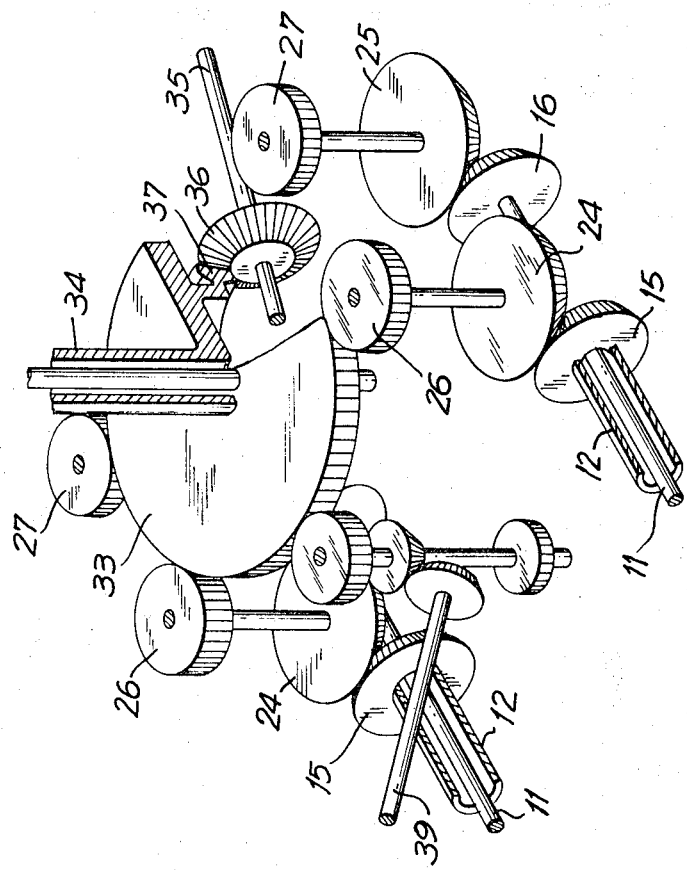
FIG. 4
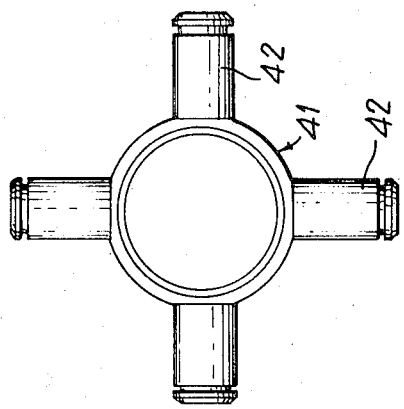
FIG. 7
FIG. 8

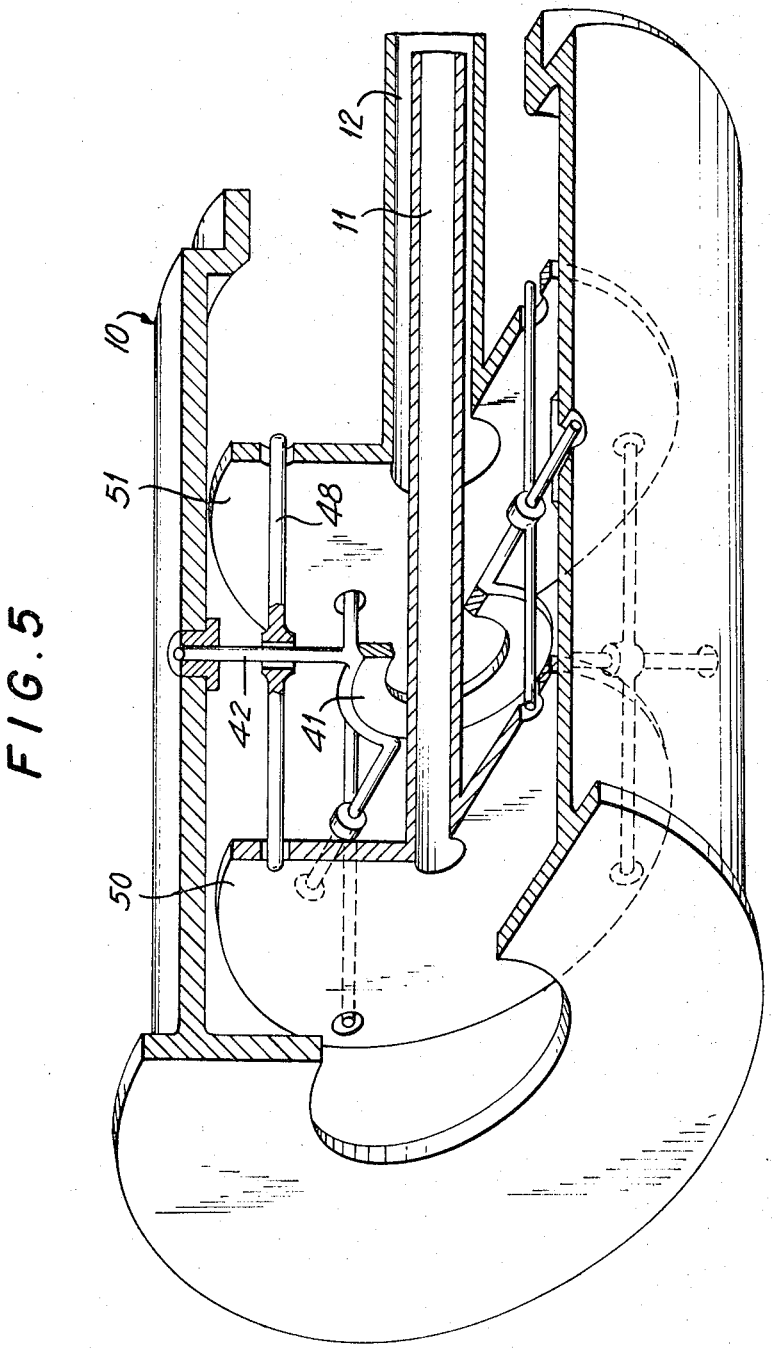

3,564,937
MECHANICAL DRIVE WITH ANGLE POWER TRANSMISSION
Pavel Alexandrovich Soloviev, Komsomolsky prospekt 90, kv. 21; Ivan Petrovich Evich, Ul. Geroev, Khasana 32, kv. 13; Georgy Petrovich Kalashnikov, Ul. Geroev, Khasana 16, kv. 53; Lev Izrailevich Kantor, Ul. Geroev, Khasana 30, kv. 37; and Sergei Nikolaevich Zamotin, Komsomolsky prospekt 73, kv. 19, all of Perm, U.S.S.R.
Filed Oct. 25, 1968, Ser. No. 770,660
Int. Cl. F16h 37/06
U.S. Cl. 74—665
4 Claims

ABSTRACT OF THE DISCLOSURE

A mechanical drive with angle power transmission is provided primarily for a helicopter and comprises input shafts which are respectively connected to pairs of coaxial shafts so as to drive the coaxial shafts in rotation. The coaxial shafts in each of the pairs are located one inside the other and first bevel gear wheels are secured to the coaxial shafts. Second bevel gear wheels are each in mesh with a respective first bevel gear wheel. Spur gear wheels fixed to the second bevel wheels mesh with a center spur gear wheel, which is mounted on an output shaft. A device is mounted between each input shaft and the pair of coaxial shafts for equalizing the torques transmitted by the coaxial shafts.

---

This invention relates to mechanical power transmissions and more particularly to mechanical drives with angle power transmission, primarily for twin-engined helicopters.

In the conventionally known mechanical drives with angle power transmission used in helicopters, the torque is transmitted from each input shaft of the drive to the common (center) bevel gear by a bevel gear wheel. The center gear wheel is thrust on an intermediate shaft. Rotation is transmitted from the intermediate shaft to a coaxial master output shaft of the rotor by means of two planetary gear drives meshed in series (see, for example, U.S. Pat. No. 2,911,968, class 74–675, 1959).

Also known is a mechanical drive for a twin-engined helicopter with parallel-installed engines. In this drive the torque is transmitted from the output shaft of each engine by spur gear wheels to a common spur gear wheel fixed to the bevel gear wheel which meshes with the center bevel gear wheel installed coaxially with the rotor shaft (see, for example, U.S. Pat. No. 2,979,968, class 74–665, 1961).

The employment of the conventionally known power transmissions of the above-mentioned type is restricted owing to comparatively small areas of contact of the meshing gear wheels. Besides, the center bevel gear wheel is rather difficult to manufacture by reason of its relatively large dimensions.

Though the first of the above-mentioned power transmissions is more compact, its employment calls for installing the engines at an angle in relation to each other which is not always desirable.

It is an object of this invention to eliminate the above-mentioned disadvantages and to provide such a drive with angle transmission of a comparatively high power to the center gear wheel mounted on the output shaft of the transmission, with the aid of bevel gear wheels, which combine the advantages of the above-mentioned types of power transmissions with a small size and high operating dependability.

In accordance with this invention, the object specified above is achieved in that the rotation from each input shaft of the drive is transmitted by means of two co-axial shafts located one inside the other, said shafts carrying bevel gear wheels, each of said gear wheels meshing with the second bevel gear wheel fixed to a spur gear wheel, said spur gear wheels being arranged along the periphery of said center gear wheel mounted on the output shaft.

According to the preferable embodiment of this invention, it is desirable to install a device for equalizing the torques transmitted by the coaxial shafts, between each input shaft of the transmission and each pair of the coaxial shafts. This device is preferably made as a plurality of journals fixed to the input shaft of the transmission and arranged radially in relation to the center line of said shaft, and double-arm levers turnably mounted on said journals, the ends of said levers being movably connected to the flanges of the coaxial shafts.

The ends of the double-arm levers are preferably connected to the flanges of the coaxial shafts through ball-and-socket bearings.

The specific features and advantages of this invention will appear more completely from the following description of a typical embodiment thereof which is given by way of example with reference to the accompanying drawings in which:

FIG. 1 is a plan view diagrammatically showing the mechanical drive of a helicopter power unit;

FIG. 2 is a side elevation view of the same transmission;

FIG. 3 is a partial section taken on line III—III in FIG. 2;

FIG. 4 is a diagrammatic illustration in perspective of the toothed gear wheels of a portion of the power transmission shown in FIG. 3;

FIG. 5 is a perspective view, partly broken away of an equalizing device forming an integral part of that portion of the transmission which is shown in FIG. 3;

FIGS. 7 and 8 show the parts of the equalizing device shown in FIG. 6.

Figure 6:
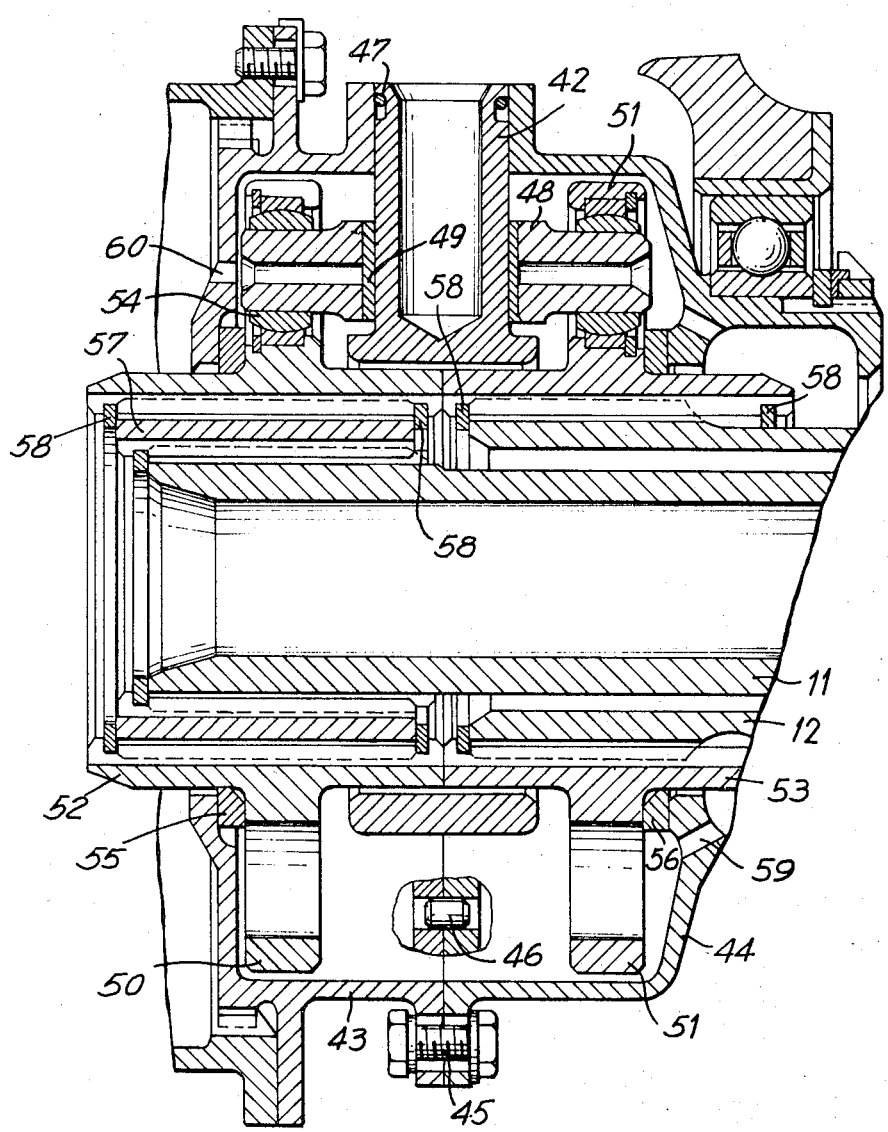
FIG. 6 shows in section the equalizing device of the transmission shown in the longitudinal section in FIG. 3.

Given hereinbelow is a description of the mechanical drive for a heavy helicopter with two gas turbine engines 1 (FIG. 1). The output shafts 2 of the engines 1 installed in the fuselage 3 of the helicopter are connected to the input shafts 4 (FIG. 3) of the mechanical drive by means of a roller coupling 5.

The roller coupling 5 compensates for possible misalignments when the engine is installed noncoaxially with the transmission. The rollers 6 which are intermediate members of the coupling are made barrel-shaped, so that the semicouplings 7 and 8 can be out-of-alignment within certain limits.

Each input shaft 4 is connected to a free-running coupling 9 by means of a splined joint. The coupling 9 disconnects the engine from transmission if the engine fails and the flight is continued with only one engine running, or when making an autorotation landing.

This coupling 9 is connected to the subsequent elements of the transmission through a device 10 which distributes the torque obtained from the engine equally between the coaxial shafts 11 and 12.

For the sake of brevity, in the description which follows this device will be termed an "equalizing mechanism."

By means of splined joints, the coaxial shafts 11 and 12 are connected, respectively, to the shafts 13 and 14 which carry bevel gear wheels 15 and 16. The shafts 13 and 14 run in bearings 17, 18 and 19 installed in bearing bodies 20, 21 and 22 which are fixed to respective bosses of the transmission casing 23.

Meshed with the gear wheels 15 and 16 are bevel gear wheels 24 and 25. Each gear pair comprising the bevel gear 24 and a spur gear 26, or a bevel gear 25 and a spur gear 27, are formed as a single body twin gear element. The twin gears are installed on stationary shafts 28 and 29 with the aid of rollers 30.

The inner surface of each twin gear and the outer surface of the shaft form races for the rollers. Two rows of rollers are accommodated in a cage 31. The axial thrust imparted to the bevel gear 24 is resisted by thrust ball bearing 32.

All spur gear wheels 26 and 27 (FIGS. 3 and 4) are arranged along the periphery of and mesh with a center spur gear wheel 33 fitted on an output shaft 34 (FIG. 4) which at the same time serves as the input shaft of the planetary reduction unit accommodated in the casing 23 shown in FIGS. 1 and 2.

The tail rotor of the helicopter (not shown in the drawing) is driven from a shaft 35 (FIGS. 1, 2, 4) which carries a bevel gear wheel 36 (FIG. 4). The gear wheel 36 meshes with a bevel gear wheel 37 fixed to the spur gear wheel 33.

A fan 38 (FIG. 1) is driven from a shaft 39 (FIG. 4) which is operatively associated through a system of meshed gears with the center spur gear 33.

The equalizing mechanism 10 (FIG. 5) comprises a cross-member 41 (FIG. 7) with four journals 42 interconnected by a ring. The cross-member 41 is tightly held in the casing consisting of two parts 43 and 44 (FIG. 6) fastened together by bolts 45 and centered with the aid of pins 46. The grooves of the journals 42 of the cross-member accommodate rubber oil-sealing rings 47.

The journals 42 mount double-arm levers 48 (FIGS. 5, 6 and 8) with bushings 49 press-fitted into their center holes.

Both ends of the levers 48 are connected to flanges 50 and 51 (FIG. 6) of supports 52 and 53 by means of ball-and-socket bearings 54. In the axial direction, the supports are fixed in the casing by means of rings 55 and 56.

The rear support 53 is connected by means of its splines to the external coaxial shaft 12. The front support 52 is connected to the inner coaxial shaft 11 through a splinded coupling 57.

The splined coupling 57 is intended for installing the levers 48, in the course of assembly, at an angle ensuring their position parallel to the axis of rotation of the coaxial shafts when the transmission is in operation.

Owing to this initial position of the levers 48 at the time of assembly, the limited moving ability of the articulated joint can be utilized in the most effective way.

The supports 52 and 53, as well as the splined coupling 57, have circular grooves for spring rings 58 which preclude the run-out of the coupling 57 and coaxial shafts 11 and 12 in relation to each other in the direction along the axis of rotation of said shafts.

Oil for the lubrication of the parts of the equalizing mechanism 10 is fed into the space between the rear support 53 and the rear part of the casing 44 from whence it flows through holes 59 into the inner space of the mechanism. The oil is drained through a hole 60 located in the wall of the front part of the casing of the equalizing mechanism 10.

In the process of power transmission from the engine, the casing of the equalizing mechanism interacts with the journals 42 of the cross-member 41. The double-arm levers 48 located on the journals 42 distribute the torque equally between the ball-and-socket bearings 54 installed in the flanges of the supports 52 and 53 (the arms of the levers 48 are of an equal length).

The supports turn through a small angle in relation to each other while taking up all the clearances in the joints of the parts of the equalizing mechanism, and uniformly load both bevel gear wheels 15 and 16.

Transmission of the torque simultaneously by two uniformly loaded bevel gear trains ensures a sharp reduction of the overall size and weight of the bevel gear drive, at the same time providing for its adequate operating dependability.

Employment of the twin gears makes it possible to use a spur gear as the main center gear wheel, thus making the manufacture of said center gear wheel less labor-consuming while improving the reliability of transmission operation.

Moreover, it provides for power transmission to the center gear wheel simultaneously from two engines.

What is claimed is:

1. A mechanical drive with angle power transmission, intended primarily for helicopters, said drive comprising input shafts for said power transmission, pairs of coaxial shafts connected to respective input shafts for being driven in rotation from said input shafts, first bevel gear wheels secured to said coaxial shafts, said coaxial shafts in each of the pairs being located one inside the other, second bevel gear wheels, a spur gear wheel fixed to each of the second bevel gear wheels, each of said second bevel gear wheels being meshed with a respective first bevel gear wheel fixed on one of said coaxial shafts, an output shaft, and a center spur gear wheel mounted on said output shaft, said center spur gear wheel being meshed with said spur gear wheels fixed to said second bevel gear wheels.

2. A mechanical drive with angle power transmission as claimed in claim 1, comprising means between each said input shaft and each said pair of coaxial shafts for equalizing the torques transmitted by said coaxial shafts.

3. A mechanical drive with angle power transmission as claimed in claim 2, wherein said means for equalizing the transmitted torques comprises a plurality of journals fixed to the associated input shaft and directed radially in relation to said shaft, and double-arm levers turnable on said journals, and flanges secured on said coaxial shafts, said levers having ends hinged to the flanges of said coaxial shafts.

4. A mechanical drive with angle power transmission as claimed in claim 3, comprising ball and socket bearings connecting the ends of said double-arm levers to said flanges.

References Cited

UNITED STATES PATENTS

| | | | |
|---|---|---|---|
| 2,305,454 | 12/1942 | Nallinger et al. | 64—1 |
| 2,389,778 | 11/1945 | Fedden et al. | 74—661 |
| 2,883,885 | 4/1959 | Upton | 74—801 |
| 3,138,010 | 6/1964 | Shipley et al. | 64—1 |
| 3,196,612 | 7/1965 | Laville et al. | 74—665X |
| 3,220,283 | 11/1965 | Ricard | 74—661 |
| 3,401,570 | 9/1968 | Sigg | 74—801 |
| 3,423,048 | 1/1969 | Clarke et al. | 170—135.75UX |

ARTHUR T. McKEON, Primary Examiner

U.S. Cl. X.R.

74—661